United States Patent
Jarl

(10) Patent No.: US 9,542,357 B2
(45) Date of Patent: Jan. 10, 2017

(54) METHOD AND APPARATUS FOR UPDATING A USER TERMINAL

(75) Inventor: Magnus Jarl, Linköping (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 703 days.

(21) Appl. No.: 13/805,814

(22) PCT Filed: Jul. 15, 2010

(86) PCT No.: PCT/EP2010/060209
§ 371 (c)(1),
(2), (4) Date: Dec. 20, 2012

(87) PCT Pub. No.: WO2012/007039
PCT Pub. Date: Jan. 19, 2012

(65) Prior Publication Data
US 2013/0117425 A1    May 9, 2013

(51) Int. Cl.
| | | |
|---|---|---|
| G06F 15/177 | (2006.01) | |
| G06F 11/14 | (2006.01) | |
| G06F 17/30 | (2006.01) | |
| H04L 12/28 | (2006.01) | |
| H04L 29/08 | (2006.01) | |

(Continued)

(52) U.S. Cl.
CPC ......... *G06F 15/177* (2013.01); *G06F 11/1433* (2013.01); *G06F 17/30702* (2013.01); *G06F 17/30867* (2013.01); *H04L 12/2898* (2013.01); *H04L 41/0869* (2013.01);

(Continued)

(58) Field of Classification Search
CPC combination set(s) only.
See application file for complete search history.

(56) References Cited

U.S. PATENT DOCUMENTS 7,747,999 B1 *   6/2010   Eng et al. ................... 717/174
2002/0188778 A1 * 12/2002   Iwanojko et al. ........... 710/104
(Continued)

FOREIGN PATENT DOCUMENTS

| EP | 1 746 767 A1 | 1/2007 |
| EP | 1 835 690 A1 | 9/2007 |

(Continued)

OTHER PUBLICATIONS

International Search Report, PCT Application No. PCT/EP2010/060209, Apr. 12, 2011.

(Continued)

*Primary Examiner* — Saket K Daftuar
(74) *Attorney, Agent, or Firm* — Patent Portfolio Builders, PLLC

(57) ABSTRACT

A method and arrangement in a User Terminal (UT) for updating an operational parameter in the UT, the method comprising: to register, for at least one software module in the UT, a corresponding validator and/or a corresponding consistency verifier to a proxy module in the UT, wherein the validator is adapted to validate parameter syntax and wherein the consistency verifier is adapted to verify parameter consistency; to receive, from a Service Provider (SP), an operational parameter to be updated in the UT; and to check syntax validity and consistency of the received operational parameter which is based on each validator and/or each consistency verifier registered to the proxy module.

22 Claims, 7 Drawing Sheets

(51) Int. Cl.
H04L 12/24 (2006.01)
H04W 8/24 (2009.01)

(52) U.S. Cl.
CPC ............ *H04L 67/125* (2013.01); *H04L 67/34* (2013.01); *H04L 41/0213* (2013.01); *H04W 8/245* (2013.01)

(56) References Cited

U.S. PATENT DOCUMENTS

| | | | |
|---|---|---|---|
| 2006/0259814 A1* | 11/2006 | Korhonen | 714/10 |
| 2007/0234294 A1* | 10/2007 | Gooding | 717/124 |
| 2008/0291855 A1* | 11/2008 | Bata et al. | 370/311 |
| 2010/0036911 A1* | 2/2010 | Sankaran | 709/204 |

FOREIGN PATENT DOCUMENTS

| | | |
|---|---|---|
| EP | 2 148 470 A1 | 1/2010 |
| EP | 2 184 903 A1 | 5/2010 |

OTHER PUBLICATIONS

Written Opinion of the International Searching Authority, PCT Application No. PCT/EP2010/060209, Apr. 12, 2011.
Written Opinion of the International Examining Authority, PCT Application No. PCT/EP2010/060209, Aug. 1, 2012.
International Preliminary Report on Patentability, PCT Application No. PCT/EP2010/060209, Oct. 18, 2012.
Broadband Forum Technical Report, "TR-069 CPE WAN Management Protocol V1.1" Issue 1, Amendment 2; XP002493850, pp. 47-48, Dec. 1, 2007.

\* cited by examiner

METHOD AND APPARATUS FOR UPDATING A USER TERMINAL

CROSS REFERENCE TO RELATED APPLICATION

This application is a 35 U.S.C. §371 national stage application of PCT International Application No. PCT/EP2010/060209, filed on 15 Jul. 2010, the disclosure and content of which is incorporated by reference herein in its entirety. The above-referenced PCT International Application was published in the English language as International Publication No. WO 2012/007039 A1 on 19 Jan. 2012.

TECHNICAL FIELD

The invention relates generally to a method and a user terminal for supporting the process of runtime updates in a user terminal.

BACKGROUND

Uninterrupted service of user-operated communication terminals is becoming more and more significant in order to enhance the user experience. At the same time, configuration of various functions of User Terminals (UTs) becomes increasingly advanced. Consequently, the demand on users' technical literacy increases in order to successfully setup and configure their UTs. This demand may hamper the potential user base. Thus, there is a demand for more simple, dynamic and occasionally more advanced remote management and configuration of UTs in order to satisfy usability and quality of service of a UT.

SUMMARY

It is an object of the invention to address at least some of the limitations, problems and issues outlined above. It is also an object to improve the process of updating UTs and preserving transactional properties. It is possible to achieve these objects and others by using a method and an arrangement as defined in the attached independent claims.

According to one aspect, the invention comprises a method in a User Terminal (UT) for updating an operational parameter in the UT. In this method the UT is registering, for at least one software module in the UT, a corresponding validator and/or a corresponding consistency verifier to a proxy module in the UT, wherein the validator is adapted to validate parameter syntax and wherein the consistency verifier is adapted to verify parameter consistency. The UT is further receiving, from a Service Provider (SP), an operational parameter to be updated in the UT, and the UT is checking syntax validity and consistency of said received operational parameter based on each of the validator and/or each of the consistency verifier registered to the proxy module.

In one example embodiment, the proxy is receiving a query from a coordinator, wherein the query comprises a query commit and wherein the proxy is sending an agree message in response to the query commit if the operational parameter is syntactically valid and consistent.

According to an example embodiment, the software module may provide the corresponding verifier and/or validator to the proxy prior to the action of registering.

According to another example embodiment the UT is sending an abort message in response to the query commit if at least one of the operational parameter is inconsistent or/and not syntactically valid, wherein the abort message comprise error information of each of the operational parameter which is inconsistent or not syntactically valid.

According to another embodiment, the proxy is storing the operational parameters and is receiving a commit message from the coordinator and is further sending, a committed message in response to receiving the commit message and is updating the UT by applying the operational parameter. In one embodiment the action of storing the operational parameters in a persistent manner is performed prior to sending a committed message.

According to another embodiment the operational parameter may be stored in a memory module such that the operational parameters are accessible from any execution environment.

In one example embodiment a UT comprises a Customer Premises Equipment (CPE) and/or the SP comprises an Auto-Configuration Server (ACS), wherein receiving an operational parameter further comprises receiving a CPE WAN Management Protocol (CWMP) Remote Procedure Call (RPC) comprising the operational parameters.

According to another example embodiment, wherein the software module comprises an OSGi software bundle.

According to another aspect of the invention, an arrangement is provided in a UT adapted to update an operational parameter comprising a communication module adapted to receive an operational parameter from a SP, and a proxy module adapted to register, for at least one software module, a corresponding validator and/or a corresponding consistency verifier, the validator is capable of validating operational parameter syntax and the consistency verifier is capable of verifying parameter consistency. The proxy module is further adapted to check syntax validity and consistency of the received operational parameter based on each of the validator and/or each of the consistency verifier registered to the proxy module.

According to one example embodiment wherein a coordinator module is adapted to issue a query to the proxy module and wherein the query comprises a query commit, and wherein the proxy module is adapted to send an agree answer in response to the coordinator module if the operational parameter is syntactically valid and consistent.

In another embodiment a memory module, adapted to store operational parameters such that the operational parameters are accessible from each of the execution environments within the UT.

According to yet another embodiment wherein the proxy module is adapted to be provided with the verifier and/or validator by the corresponding software module.

In another embodiment wherein the proxy module is adapted to store pending operational parameters if the operational parameters are syntactically valid and consistent.

According to one example embodiment, wherein the proxy module is adapted to provide an abort message to the coordinator module if at least one of the operational parameters are inconsistent and/or syntactically valid.

According to one embodiment wherein the abort message which is sent to the coordinator module comprising error information of each of the at least one operational parameter which is inconsistent or not syntactically valid.

According to another embodiment wherein the coordinator is adapted to issue a commit message to the proxy module, and wherein the proxy module is adapted to persistently store the operational parameters to the memory module, the proxy module is further adapted to send a committed message to the coordinator module.

According to another embodiment wherein the proxy module is further adapted of updating the UT with the new operational parameters if the operational parameters are syntactically valid and consistent according to each of the validators and each of the verifiers.

According another embodiment wherein the UT comprises a Customer Premises Equipment (CPE) and/or the SP comprises an Auto-Configuration Server (ACS).

According to any one of the embodiments, wherein the communication module is adapted to receive a CPE WAN Management Protocol (CWMP) Remote Procedure Call (RPC) comprising the operational parameter.

Further possible features and benefits of this solution will become apparent from the detailed description below.

BRIEF DESCRIPTION OF DRAWINGS

The invention will now be described in more detail by means of some example embodiments and with reference to the accompanying drawings, in which.

DETAILED DESCRIPTION

In the following a detailed description is provided of a method and apparatus which may be enabled to enforce syntactical validation by formal expressions as well as to enforce verification of consistency constraints which may be described in a non-formal language. It must be noted that, as used in this specification and the appended claims, the singular forms "a", "an" and "the" include plural referents unless the context clearly dictates otherwise.

According to some scenarios, installations of new software and/or re-configuration sometimes require services running at the UT to restart in order to update. In such a scenario, the service will be interrupted in order to apply new instances of the service or configuration to the existing instance of the service.

Different services within the system of a UT are often interdependent of each other. One such example is parameters which must be coherent and consistent in order to ensure interoperability between services or applications running at a UT. Consistency constraints regarding parameters are often not expressed in a formal way, i.e. not machine interpretable. In fact, sometimes only non-formal expressions of the consistency constraints are obtainable.

UTs may run distributed systems comprising mixed objects from different execution environments. One example of this is the coexistence of objects managed in an OSGi environment and objects managed in a native environment. OSGi is a framework providing software modularity and allowing software modules to be deployed and thus configured in runtime. According to the above-mentioned constraints of parameter consistency and validity, another problem is to assure the consistency, validity and possibility for transactional rollback in each part of the system of a UT.

Figure 1:
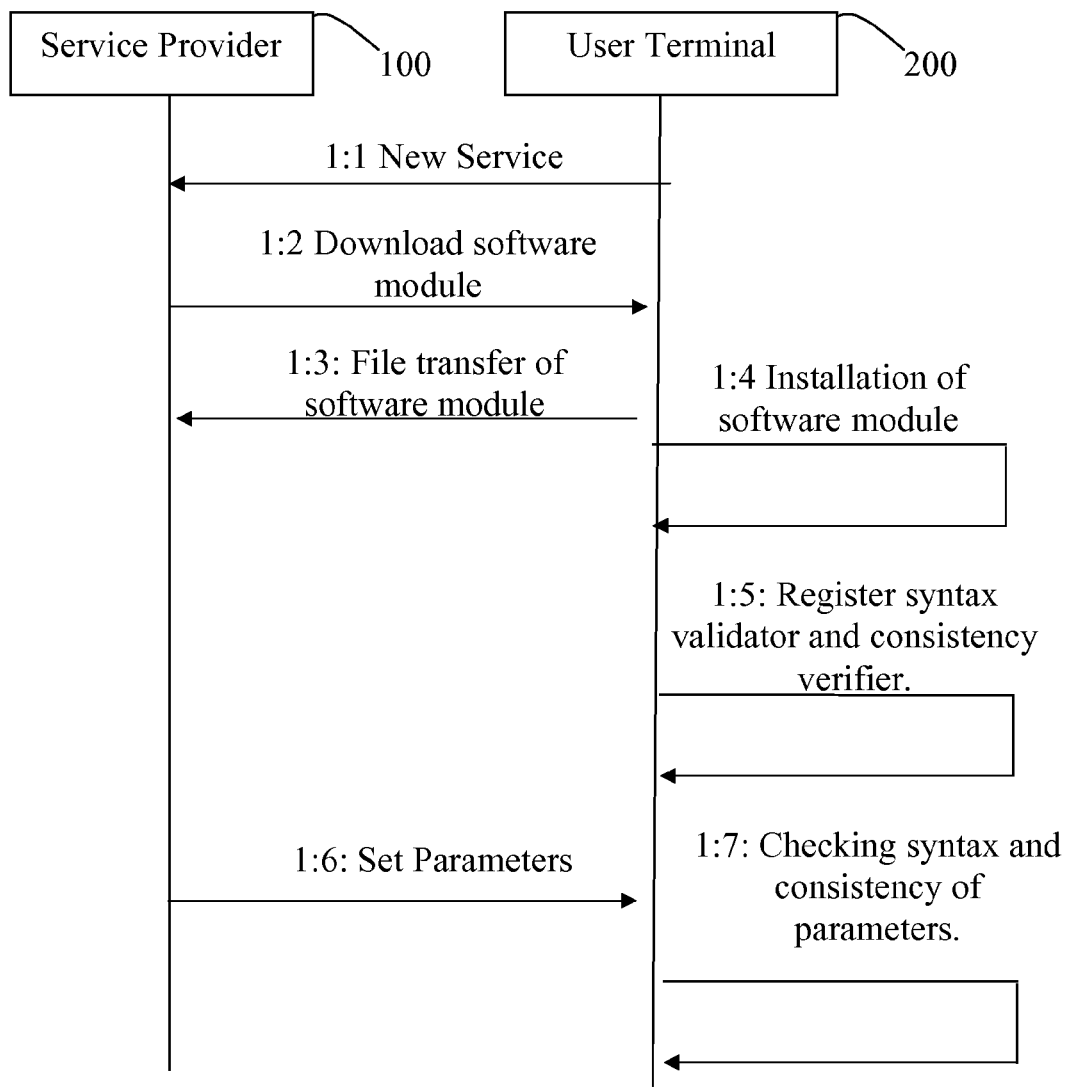
FIG. 1 illustrates a signaling scheme for interaction between an SP and a UT, according to one embodiment.

The description is now referring to a set of illustrative figures, starting by showing FIG. 1 illustrating one example of a signaling flow between a UT 200 in communication with a SP 100. The UT 200 requests a new service in a first action 1:1. Alternatively, the SP 100 may push a new service to the UT 200 without a preceding request. If a new software module is needed in order to enable the new service in the UT 200 the SP 100 will direct the UT 200 to download the software module in a subsequent action 1:2. In the following action 1:3, a file transfer of the software module is performed. The file transfer itself can typically be done by protocols known in the prior art. The software module may be a software bundle comprising software enabling the new service at the UT 200, although the invention is not limited to any particular software types. In a subsequent action 1:4 the UT makes the needed operations in order to install the software module to the UT. The software module further typically comprises one or more syntax validators and one more consistency verifier.

In order to dynamically add syntactical validators and consistency verifiers to the UT 200, each software module comprise its associated logic for validating the syntax of new parameters and verifying if consistency constraints are satisfied. It should be appreciated by the person skilled in the art that the associated logic can be provided by other means as well. I.e. the logic for verifying syntax and consistency verification may be provided by other means than being carried and provided by the software module. However, in order to achieve software modularity and self-containment of each software module, it is suggested that each software module comprises associated syntax validators and consistency verifiers.

In an action 1:4 the UT 200 registers the associated logic for validation of parameter syntax and consistency constraints to one single location having a relaying function within the UT 200. The single location, typically associated with an execution environment, is hereinafter referred to as a proxy 220. In one embodiment, the software module may provide an instruction, i.e. a configuration file, to the proxy 200 and thereby enabling the proxy to, based on the instruction, create a corresponding consistency verifier.

The term "execution environment", is used in this description to represent a manageable environment, running in or on the native system. A few non-limiting examples are OSGi comprising managing software bundles or Red Hat Linux comprising the managing software Red Hat Package Managers (RPMs). Numerous other possible execution environments will be apparent to the person skilled in the art.

In a subsequent action 1:5 the SP 100 issues a command to update the UT 200 with new values of parameters for use in one or more functions or applications installed in the UT 200. Such parameter values will hereinafter be referred to as "operational parameters". An operational parameter could for example be a parameter needed for configuration of the UT 200 which may be updated by remote management. A non-limiting example of operational parameters could comprise time-out values or network addresses for configuration in multiple execution environments within the UT 200. Even if this description refers to an operational parameter, it should hereinafter be understood that this term can comprise one or a plurality of specific operational parameters. It could in some embodiments also comprise a list of specific operational parameters. Moreover, when using the terms "syntax validator" or "consistency verifier" it should be appreciated that this can mean one or several validators or verifiers. In one embodiment, a software module may comprise one or more syntax validator to each operational parameter in order to verify one or multiple aspects of the syntax validity.

In order to verify if the new operational parameters are allowable for updating the UT, an action of checking 1:6 the syntax and consistency of parameters is performed. The UT is basing the checking action on the syntax validators and consistency verifiers which have been provided during action 1:4 for one or a plurality of module installations.

Figure 2:
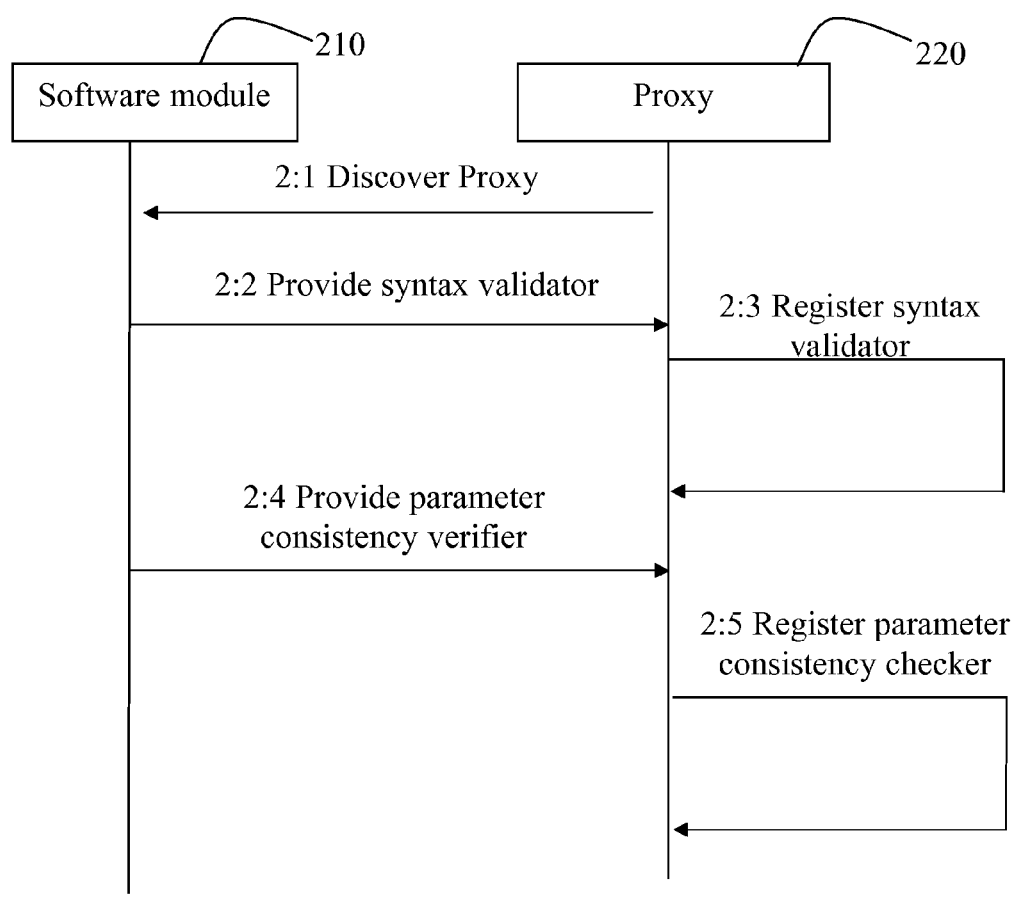
FIG. 2 shows an embodiment of a procedure in a UT, where a proxy module registers the validators and/or consistency verifiers of a software module.

FIG. 2 illustrates in more detail one embodiment of executing the action of 1:4 in FIG. 1. FIG. 2 shows a schematic embodiment of a discovery framework for enabling a software module 210 in a UT to discover a proxy 220 in the UT and to register syntax validators and consistency verifiers. The proxy 220 typically serves one or more entities of a non-native environment, in this case exemplified with the software module 210. However, the proxy could also emulate other types of entities as well.

In a first action 2:1 the proxy 220 sends a discover message to the software module 210. In some embodiments, the proxy 200 further comprises a service discovery software module. Such a service discovery module may be configured to provide newly installed software modules, references to each of the other software modules and the proxy 200. As a response to receiving the discovery message, the software module 210 provides the syntax validator associated with the software module 210 in action 2:2. The proxy 200 registers, in action 2:3 the validator such that the proxy is capable of invoking the syntax validator when needed The person skilled in the art will recognize that a syntax validator may be provided in various different ways, for instance by means of executable software code or as a reference to a formal specification which can be interpreted and translated into a syntax validator when needed or when a software module is installed.

In action 2:4 the software module 210 provides a parameter consistency verifier to the proxy 220. The proxy 220 registers the consistency verifier and, for example, holds an instance of the consistency verifier or a reference enabling the proxy 220 to dynamically invoke the parameter consistency verifier when needed.

It should be noted that the actions 2:2 to 2:5 can be performed in any mutual order, e.g. the parameter consistency verifier can be provided 2:4 before the action of providing a syntax validator 2:2.

If the consistency constraints to a UT are provided in natural language the constraints will normally needs to be implemented in a consistency verifier by a human. I.e. the rules to be satisfied in order to ensure consistency are implemented by a human and provided to the UT.

Figure 3:
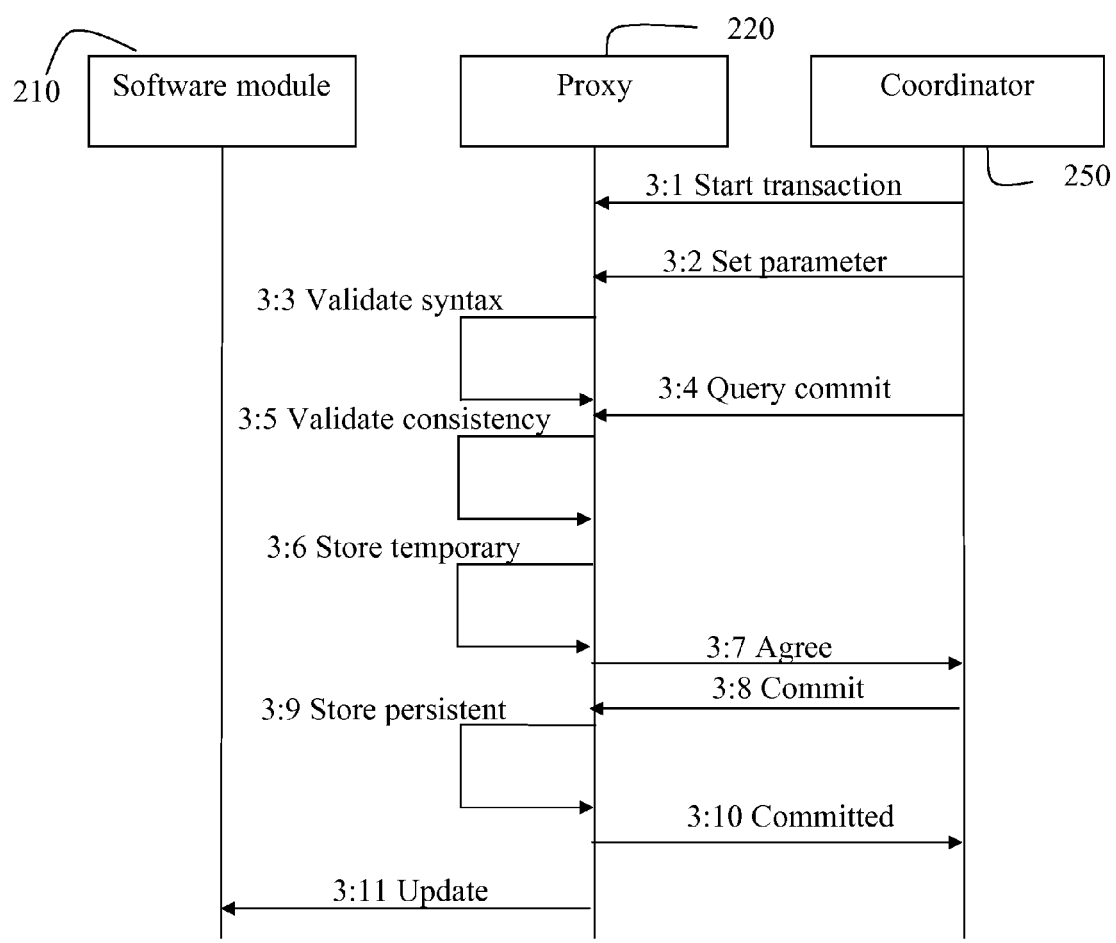
FIG. 3 illustrates a procedure of updating operational parameters within a UT, according to yet another embodiment.

Once syntax validators and consistency verifiers have been registered, the UT is capable of receiving new parameters from the SP and still enforces the transactional properties such as atomicity and consistency. FIG. 3 shows one schematic example of an embodiment illustrating the interaction between a coordinator 250, a proxy 220 of FIG. 2 and a software module 210. The coordinator 250 enables coordination of setting operational parameters in different locations of the UT 200 to enforce atomicity and consistency according to a two-phase commit protocol. According to the common terminology used for a two-phase commit protocol, the proxy 220 can be seen as acting as a "cohort" comprising a persistent storage, and the coordinator 250 is the "master" which is initiating the transaction. Other examples of cohorts involved in a two-phase commit within the UT may be native parts of the system or other proxies. This will be further described below.

In a first action 3:1, the coordinator 250 starts the transaction which initiates the procedure of updating operational parameters. In a subsequent action 3:2, the coordinator 250 provides the operational parameters to the proxy 220. In order to validate the operational parameters syntactically, the proxy 220 checks the operational parameters according to the registered syntax validators in action 3:3. If the parameters are syntactically wrong, an error message will be propagated from the proxy 220 to the coordinator 250. The error message will typically also further propagate back to the origin of the operational parameters to enable correction of syntax and if possible re-initiation of the update of operational parameters. Such an error message may typically comprise a per-parameter error code and message indicating the nature of the error. In an update of a plurality of operational parameters, normally all new operational parameters are syntactically validated prior to the proxy finishing off the action of 3:3.

Then, the coordinator 250 queries each of the involved cohorts to commit to the new parameters. However, in this example only the proxy 220 is shown for clarity reasons. The proxy 220 is queried to commit to the new operational parameters in action 3:4 which also normally is the first action in a two-phase commit protocol. The proxy 220 needs to ensure that the new operational parameters satisfy the consistency constraints before answering the coordinator 250. This is done by applying each of the consistency verifiers registered at the proxy 220 to ensure consistency towards each of the entities 210 served by the proxy 220. If the consistency verifiers approve on consistency in action 3:5, the proxy 220 will, according to action 3:6, store the operational parameters temporary but persistent and subsequently send an agree message 3:7 to the coordinator 250. If the consistency validation action 3:5 fails, i.e. at least one parameter has turned out to be inconsistent, an error message may be sent from the proxy 220 to the coordinator 250. Such error message may comprise a per-validator error code and message indicating the nature of the error as well as a transaction rollback. The error message will typically propagate to the origin of the new operational parameters.

Once the coordinator 250 has received agree messages from all the cohorts involved in the transactional operational parameter update (not shown), the coordinator 250 issues a commit message to the proxy 220 in action 3:8. As a response to the commit message the proxy 220 will, according to action 3:9, store the new operational parameter values in a persistent manner. This action ensures that the new operational parameters can survive a UT 200;400 power cycle or system failure when a committed message is provided to the coordinator 250 in action 3:10. A successful procedure according to the two-phase protocol will typically finish with an action of updating the relevant entities with new operational parameters, as shown in action 3:11.

It should be noted that the actions 3:8 to 3:11 can be performed in many different mutual orders, which will become apparent to the person skilled in the art. In one embodiment, the action of 3:8 is consecutively followed by 3:11. In such scenario the software module performs the action of persistent storing and provides the proxy with a notice that persistent storing is performed and a committed message, which is relayed to the coordinator.

Figure 4:
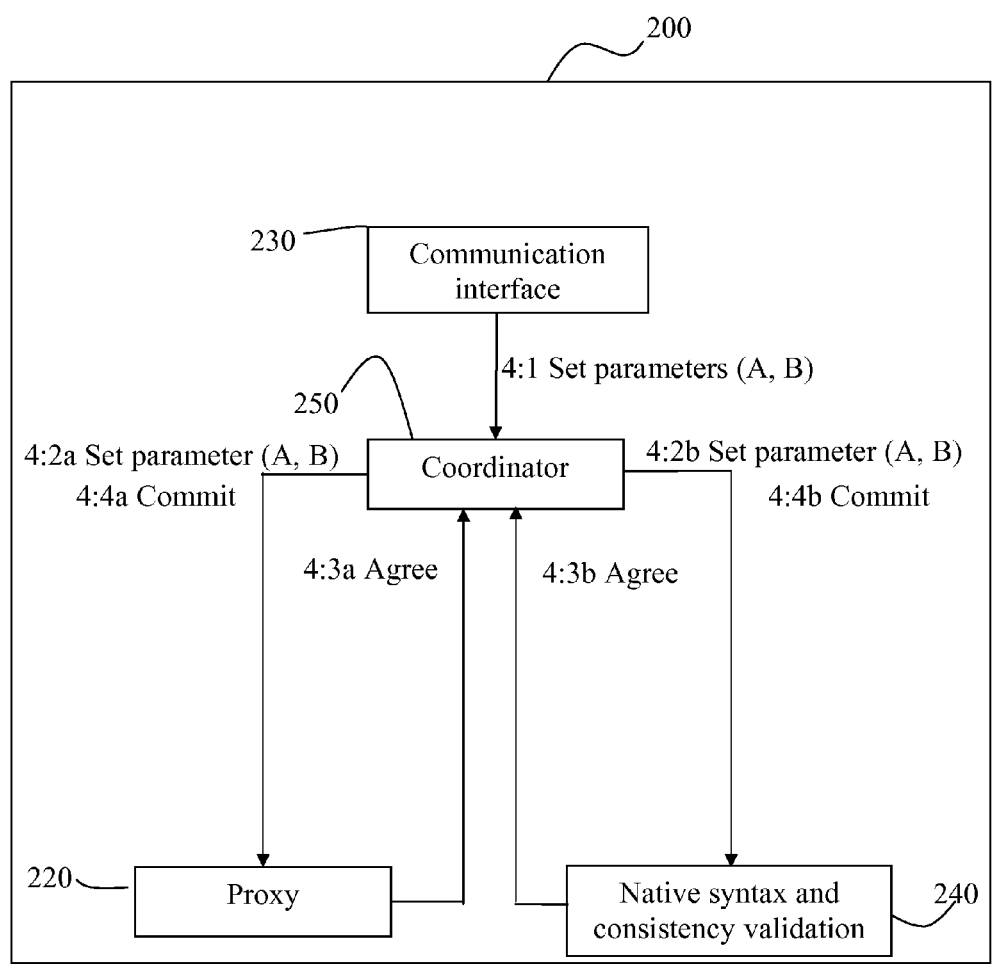
FIG. 4 illustrates, according to one embodiment, a two-phase commit scenario involving a coordinator, a proxy and the native system of the UT.

In FIG. 4 one embodiment of a two-phase commit example scenario is illustrated. This particular scenario shows a coordinator in combination with the proxy and another cohort which in this scenario is the native execution environment of the UT. Another type of cohort can for example be another proxy serving yet another execution environment.

The person skilled in the art recognizes that even if this example scenarios feature only two cohorts 220:240, the same description is applicable for any number of cohorts involved in a two-phase commit scenario.

In the scenario according to FIG. 4, a communication interface 230 receives new operational parameters to be updated. In one embodiment, the new operational parameters are provided in correspondence with action 1:5 of FIG. 1, i.e. from a SP which typically could be an ACS and where the communication interface within a CPE receives a Set-ParameterValues RPC.

The coordinator 250 receives the parameters from the communication interface 230 according to action 4:1. In this scenario, the coordinator 250 starts the transactional update of the operational parameters by issuing set parameter requests to the proxy 220 and the native system in action 4:2a;4:2b. In one embodiment, the proxy 220 performs the above actions 3:3-3:6. The proxy 220 responds to the coordinator with an agree message in action 4:3a, if new parameters have proved to be allowable with respect to consistency and syntax. Dynamic validation and consistency verification procedures of other cohorts, in this scenario the native system, are implemented depending of the nature of the cohort. If the parameters are syntactically valid and consistent according to each of the syntax verifiers and each of the consistency verifiers, the coordinator will issue a commit message to the cohorts to invoke a persistent storage and update of the new operational parameters. This is illustrated by the actions 4:4a;4:4b in FIG. 4.

In another optional embodiment the operational parameters are comprised in a central data storage residing within the UT 200. The central data storage is adapted to be accessible to all cohorts within the UT 200, such as the proxy and the native system. This would typically enable all syntax validators and consistency verifiers of the plurality of cohorts in the UT to access all data to ensure consistency, independent of the nature of the cohort. This would then not require the coordinator to provide all cohorts with all new operational parameters which are going to be updated.

Figure 5:
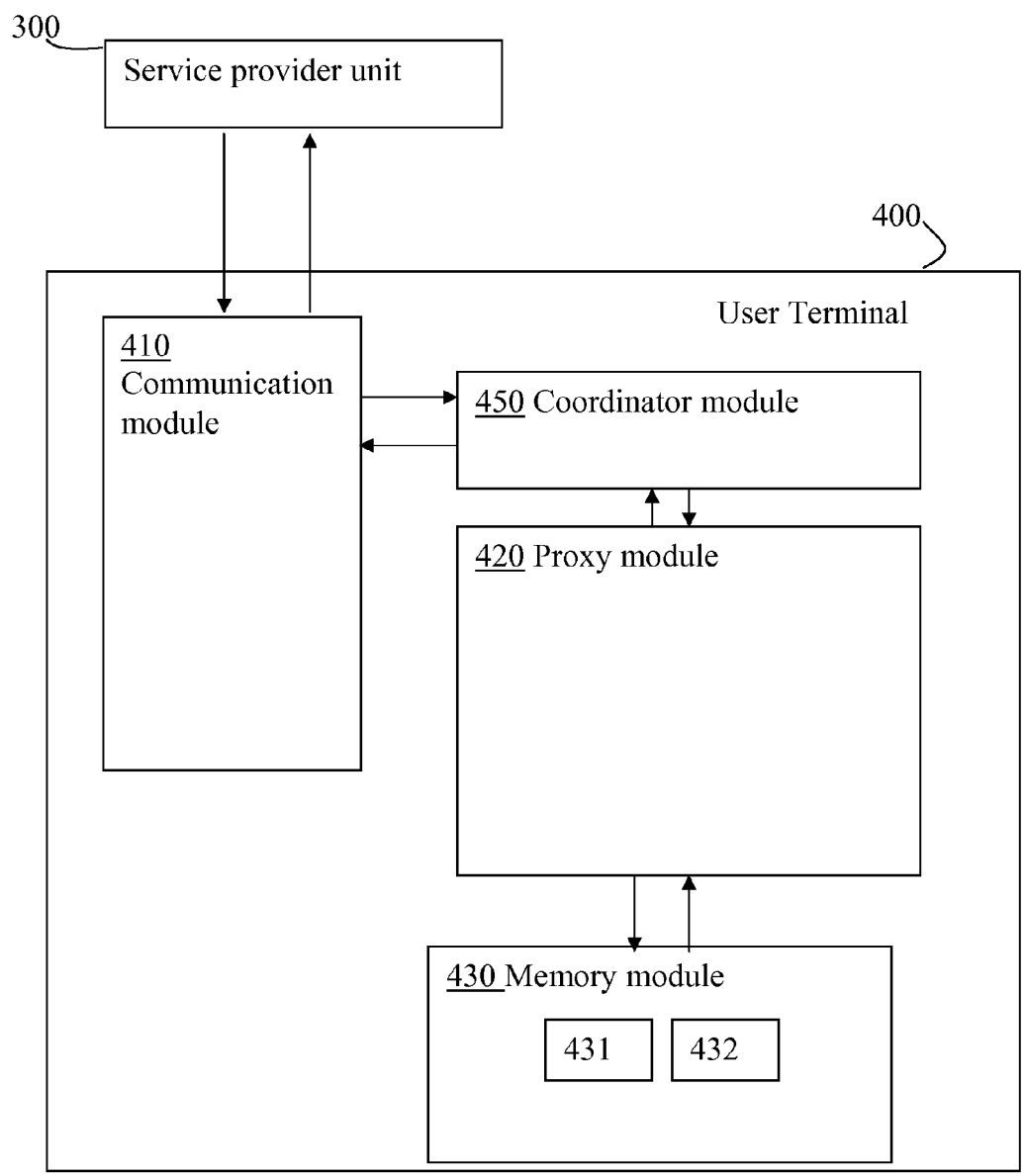
FIG. 5 is a block diagram illustrating a UT according to yet another embodiment.

FIG. 5 shows in more detail a UT 400 according to some further possible embodiment. The UT 400 comprises a communication module 410 capable of communicating with for example a SP 300. The communication module may be adapted to parse and adapt incoming commands. The communication module 410 may also be capable of handle network communication. The communication module 410 is arranged to forward new parameters to a coordination module 450 within the UT 400. The coordination module 450 is adapted to ensure the transactional properties of updating new parameters to different parts of the UT. For example, the coordinator module 450 may coordinate updating of operational parameters in a plurality of locations within the UT 400 which resides within the native system or within a non-native system.

According to one embodiment, the coordinator module 450 is arranged to issue updates of new operational parameters to a proxy module 420. The proxy module 420 typically serves a non-native execution environment of the UT 400.

The proxy module 420 comprises syntax validators and consistency verifiers which can be used which an agree or abort decision may be based on. The syntax validators and consistency verifiers may typically be registered to the proxy module. Further, the syntax validators and consistency verifiers may be provided by software modules residing within the non-native execution environment. A syntax validator is adapted to control the syntactical validity of an operational parameter. A consistency verifier is adapted to verify that a new operational parameter is consistent according to a set of consistency constraints. The coordinator module 450 may further be adapted to perform operational parameter update in accordance with a two-phase commit procedure.

The proxy module 420 is arranged operatively connected to a memory module 430 comprising a temporary but persistent storage 431 and a persistent storage 432 enabled storing, for example, new operational parameters. In one embodiment, the memory module 430 comprises each of the new operational parameters independent of if the operational parameters will be updated in a non-native environment or not.

It should be noted that FIG. 5 merely illustrates various functional modules or units in the UT 400 in a logical sense, although the skilled person is free to implement these functions in practice using suitable software and hardware means. Thus, the invention is generally not limited to the shown structures of the UT 400, while its functional modules 410;420;430;440;450 may be configured to operate according to the features described for FIGS. 2-4 above and FIGS. 6-7 below, where appropriate.

The functional modules 410;420;430;440;450 described above can be implemented in the UT 400 as program modules of a computer program comprising code means which when run by a processor in the UT 400 causes the UT 400 to perform the above-described functions and actions. The processor may be a single CPU (Central processing unit), or could comprise two or more processing units. For example, the processor may include general purpose microprocessors, instruction set processors and/or related chips sets and/or special purpose microprocessors such as ASICs (Application Specific Integrated Circuit). The processor may also comprise board memory for caching purposes.

The computer program may be carried by a computer program product in the UT 400 connected to the processor. The computer program product comprises a computer readable medium on which the computer program is stored. For example, the computer program product may be a flash memory, a RAM (Random-access memory), a ROM (Read-Only Memory) or an EEPROM (Electrically Erasable Programmable ROM), and the program modules could in alternative embodiments be distributed on different computer program products in the form of memories within the UT 400.

A method for updating an operational parameter in a UT will now be described with reference to the flow chart in FIG. 6. This action in this method may be performed by the UT shown in FIG. 5. In a first action 501 a software module is registering a corresponding consistency verifier and/or a corresponding validator to a proxy module within the UT. The validator is adapted to validate the syntax of the operational parameter, and the consistency verifier is adapted to verify whether or not a parameter is allowable from a consistency perspective. In another action 502, a SP sends an operational parameter to be updated which is received by the UT. In order to enable the UT to verify the transactional properties of atomicity and consistency the proxy module in the UT is checking the syntax validity and verifies the consistency of the received operational parameters in action 503. In this action, the proxy may query each of the registered syntax validators and typically also each of the registered consistency verifiers, if at least one of the registered syntax validators or at least one of the consistency verifiers fails to approve the new parameters the procedure of updating the parameters will fail gracefully. In the scenario of inconsistent or syntactically incorrect operational parameters, an error message will typically propagate back to the origin of the operational parameters.

Figure 6:
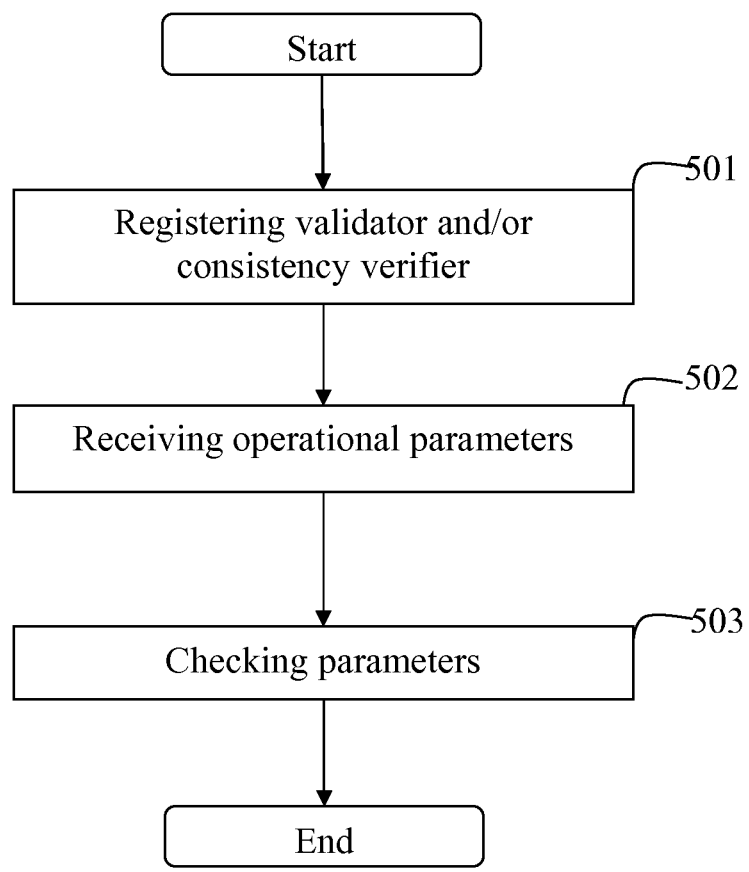
FIG. 6 shows a flow chart of a method for checking operational parameters according to one embodiment.
Figure 7:
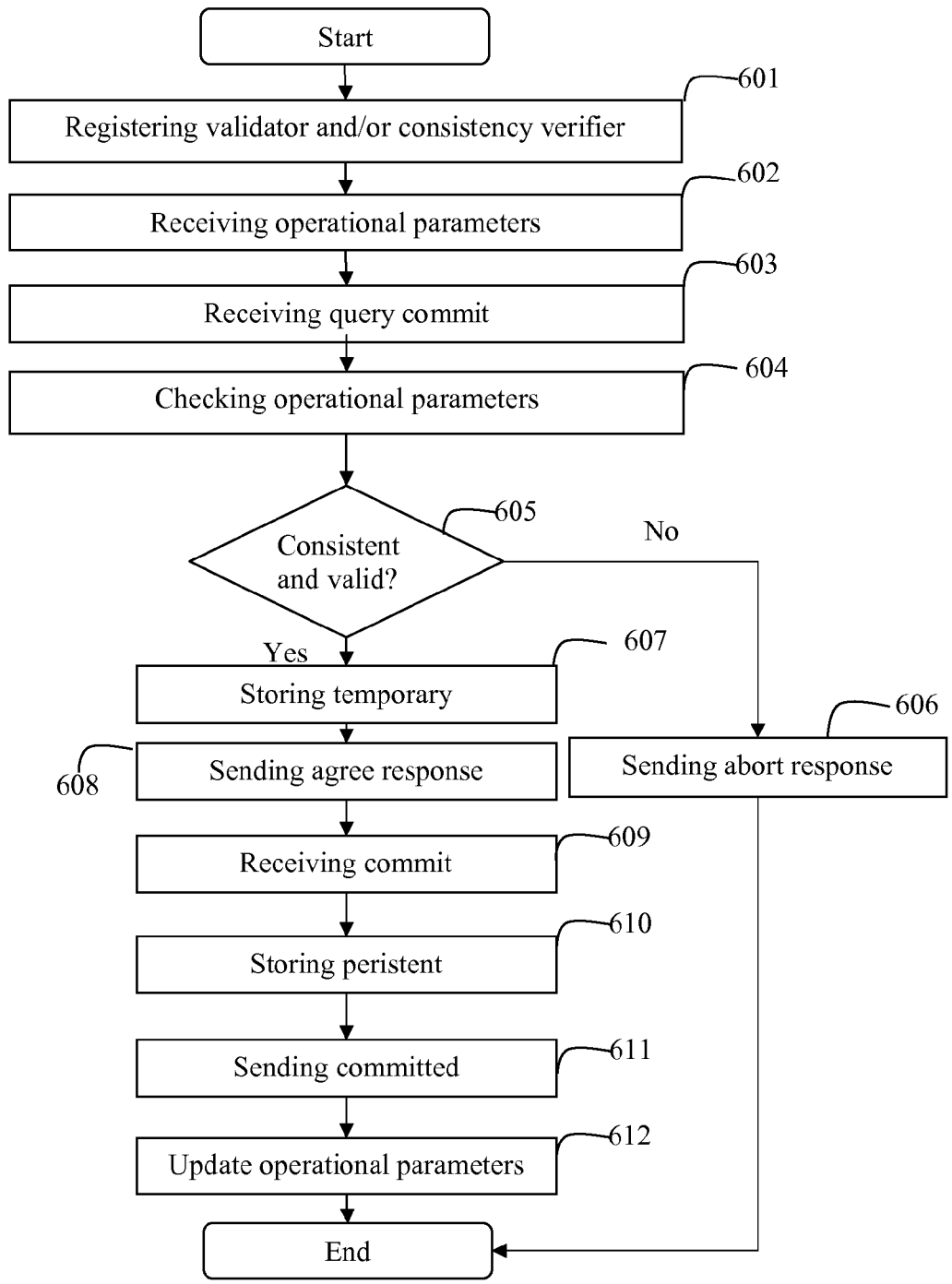
FIG. 7 is a flow chart of a method for updating operational parameters in a UT preserving transactional properties according to one embodiment.

A more detailed example procedure of how the method in FIG. 6 can be performed for updating an operational parameter in a UT is disclosed in FIG. 7. FIG. 7 aims to schematically illustrate the method of updating an operational parameter by performing a two-phase commit procedure. A coordinator within the UT is the master while the proxy is acting cohort in this particular embodiment.

In a first action 601, the UT registers syntax validators and consistency verifier to the proxy. The proxy receives an operational parameter to be updated in the UT from the coordinator according to action 602. In action 603 the coordinator issues a query commit which is received 603 by the proxy. In response to receiving the above-mentioned query commit, the proxy is checking the operational parameters in action 604. This is typically performed by letting the proxy query each of the registered syntax validators and typically also each of the registered consistency verifiers to ensure consistency and syntax validity. If the syntax validators and consistency verifiers approve of the new operational parameters in action 605, the operational parameters are stored temporarily but in a persistent manner 607.

In the scenario when at least one of the registered syntax validators or at least one of the consistency verifiers fails to approve the new operational parameters, the procedure of updating the parameters will fail gracefully. I.e. if one of the new operational parameters is inconsistent or syntactically incorrect operational parameters, an abort message will be sent 606 to the coordinator from the proxy. Such abort message will typically propagate back to the origin of the operational parameters.

In the scenario where the operational parameters are stored 607 the proxy sends an agree response 608 to the coordinator. The SP will normally issue a commit message to the cohorts when all constraints according to the two-phase commit protocol are satisfied. The proxy receives 609 the commit message from the coordinator and persistently stores the new operational parameters in action 610.

Subsequent to persistently storing the new operational parameters, the proxy sends 611 a committed message to the coordinator. In a last action 612, the proxy applies the new operational parameters. This is typically performed by updating each of the entities, i.e. by providing the new operational parameters to the software modules intended for update.

The above-described two-phase commit procedure enables a parameter update within an execution environment to preserve the transactional properties. Moreover, the update procedure is robust towards system failures such as unplanned power cycles i.e. the state of the update will either automatically rollback or commit without allowing any inconsistent or syntactically invalid parameters.

In one possible embodiment that can be used in any of the above described methods or arrangements, the UT 200;400 comprises a CPE. Further, according to any of the above described embodiments, SP 100 may comprise an ACS. In such embodiment the communication between a CPE and an ACS is done according to CWMP. I.e. new parameters are provided to the CPE from the ACS by for instance a CWMP SetParameterValues RPC.

In one embodiment, the proxy 220;420 is a proxy between an OSGi environment and the native environment in a CPE. According to yet another embodiment the software module comprises a software bundle according to OSGi which is served by the proxy 220;420.

The solution described above may be used to enable remote management of UTs enforcing of consistency constraints which are expressed in a non-formal way. Moreover, the dynamic addition of consistency verifiers is useful in order to prevent rebooting a UT to achieve, for example, operational parameter update. This document also describes how to perform the consistency verification and syntax validation according to a transactional protocol, such as the two-phase commit protocol.

One example of such system in need of service is remote management and dynamic update of parameters in a Customer Premises Equipment (CPE). The CPE is typically managed by an Auto-Configuration Server (ACS) through for instance the standardized CPE WAN Management Protocol (CWMP).

According to one example, an ACS issues a Remote Procedure Call (RPC) to update a running version of a CPE, i.e. the ACS is issuing a SetParameterValues RPC. Typically, this RPC includes id-value combinations where the id is the name of the parameter and the value the new value of the parameter. When updating parameter values, the syntax and consistency of parameters typically need to be checked before updating. If one or several new parameters turn out to be syntactically wrong or if the system state becomes invalid as a result of applying new parameter values, the update procedure must fail gracefully, i.e. without impacting the overall functionality of the CPE. Due to the transactional properties required by CWMP the installations and/or update of parameters in the CPE need to rollback. Also, the CPE needs to communicate an error message comprising information regarding the reason for failure to the ACS in order to correct and re-execute the RPC. This responsibility typically falls on the CPE to ensure validity and parameter consistency.

While the invention has been described with reference to specific exemplary embodiments, the description is generally only intended to illustrate the inventive concept and should not be taken as limiting the scope of the invention. For example, the terms "operational parameter", "execution environment", "software module", "proxy" and "coordinator", have been used throughout this description, although any other corresponding functions, parameters, nodes and/or units could also be used having the functionalities and characteristics described here. The invention is defined by the appended claims.

ABBREVIATIONS

ACS—Auto-Configuration Server
CPE—Customer Premises Equipment
CWMP—CPE WAN Management Protocol
HTTP—HyperText Transfer Protocol
OSGi—Open Service Gateway initiative
RPC—Remote Procedure Call
Service Provider—SP
User Terminal—UT

The invention claimed is:

1. A method in a User Terminal (UT) for updating one or more operational parameters in the UT, the method comprising:
   upon reception of a discovery message from a proxy module in said UT, registering, by at least one software module in said UT, a corresponding syntax validator and a corresponding consistency verifier to the proxy module in said UT, wherein said at least one software module is provided by a Service Provider (SP) that is external to said UT, and wherein said corresponding syntax validator is adapted to validate parameter syntax and said consistency verifier is adapted to verify parameter consistency, and further wherein said corresponding syntax validator and said corresponding consistency verifier are provided by said at least one software module;
   receiving, from the Service Provider (SP), said one or more operational parameters to be updated in said UT; and
   checking syntax validity and consistency of said received one or more operational parameters based on each of said syntax validator and each of said consistency verifier registered to said proxy module.

2. A method according to claim 1, further comprising:
   receiving, to said proxy module, a query from a coordinator, wherein said query comprises a query commit; and
   sending an agree message in response to said query commit in response to said one or more operational parameters being syntactically valid and consistent.

3. A method according to claim 1, wherein said at least one software module provides said corresponding consistency verifier and syntax validator to said proxy module prior to the action of registering.

4. A method according to claim 2, further comprising:
   sending an abort message in response to said query commit in response to at least one of said one or more operational parameters being inconsistent or/and not syntactically valid.

5. A method according to claim 2, further comprising:
   storing said one or more operational parameters;
   receiving a commit message from said coordinator;
   sending a committed message in response to receiving said commit message; and
   updating said UT by applying said one or more operational parameters.

6. A method according to claim 4, wherein said sending further comprises including, in said abort message, error information of each of said one or more operational parameters which are inconsistent or not syntactically valid.

7. A method according to claim 5, wherein said sending is preceded by an action comprising:
   storing said one or more operational parameters in a persistent manner.

8. A method according to claim 7, wherein said receiving further comprises storing said received one or more operational parameters in a memory module, said one or more operational parameters being accessible from any execution environment.

9. A method according to claim 8, wherein the UT comprises a Customer Premises Equipment (CPE) and/or the SP comprises an Auto-Configuration Server (ACS).

10. A method according to claim 9, wherein receiving said one or more operational parameters further comprises receiving a CPE WAN Management Protocol (CWMP) Remote Procedure Call (RPC) comprising said one or more operational parameters.

11. A method according to claim 10, wherein said at least one software module comprises an OSGi software bundle.

12. A User Terminal (UT) adapted to update one or more operational parameters, the UT comprising:
   a memory comprising a communication module, a proxy module, and one or more software modules provided by a Service Provider (SP) that is external to said UT; and
   a processor communicatively coupled to the memory, the processor configured to execute:
   the communication module to receive said one or more new operational parameters from the Service Provider (SP);
   the proxy module to register, by at least one of the one or more software modules, a corresponding syntax validator and a corresponding consistency verifier, said corresponding syntax validator and said corresponding consistency verifier being provided by the at least one of the one or more software modules, said corresponding syntax validator is capable of validating operational parameter syntax and said corresponding consistency verifier is capable of verifying parameter consistency; and
   wherein the processor is further configured to execute the proxy module to check syntax validity and consistency of said one or more new operational parameters based on each of said corresponding syntax validator and each of said corresponding consistency verifier registered to the proxy module.

13. A UT according to claim 12, wherein the memory further comprises a coordinator module, and further wherein the processor is configured to execute:
   the coordinator module to issue a query to the proxy module, wherein said query comprises a query commit; and
   the proxy module to send an agree answer in response to the coordinator module in response to said one or more operational parameters being syntactically valid and consistent.

14. A UT according to claim 12, wherein the memory further comprises a memory module, and further wherein the processor is configured to execute:
   the memory module to store said one or more operational parameters, said one or more operational parameters being accessible from any execution environment within the UT.

15. A UT according to claim 12, wherein the processor is further configured to provide the proxy module with said corresponding consistency verifier and said corresponding syntax validator by the corresponding software module of the one or more-software modules.

16. A UT according to claim 13, wherein the processor is further configured to execute the proxy module to store pending one or more new operational parameters in response to said one or more new operational parameters being syntactically valid and consistent.

17. A UT according to claim 13, wherein the processor is further configured to execute the proxy module to provide an abort message to the coordinator module in response to said one or more new operational parameters being inconsistent not syntactically valid.

18. A UT according to claim 17, wherein said abort message, provided to the coordinator module, comprises error information of said one or more new operational parameters which are inconsistent or not syntactically valid.

19. A UT according to claim 18, wherein the processor is further configured to execute:

the coordinator module to issue a commit message to the proxy module, and wherein the proxy module is configured to persistently store said one or more new operational parameters to the memory module, and the proxy module to send a committed message to the coordinator module.

20. A UT according to claim 12, wherein the processor is further configured to execute the proxy module to update the UT with said one or more new operational parameters in response to said one or more new operational parameters being syntactically valid and consistent according to each of said corresponding syntax validator and each of said corresponding consistency verifier.

21. A UT according to claim 20, wherein the UT comprises a Customer Premises Equipment (CPE) and/or the SP comprises an Auto-Configuration Server (ACS).

22. A UT according to claim 21, wherein the processor is further configured to execute the communication module to receive a CPE WAN Management Protocol (CWMP) Remote Procedure Call (RPC) comprising said one or more new operational parameters.

* * * * *